United States Patent
Kurasawa et al.

(10) Patent No.: US 7,626,280 B2
(45) Date of Patent: Dec. 1, 2009

(54) STARTER HAVING CONNECTING MEMBER ELECTRICALLY CONNECTING MAGNETIC SWITCH AND MOTOR

(75) Inventors: Tadahiro Kurasawa, Chita-gun (JP); Kazuhiro Andoh, Okazaki (JP); Yamato Utsunomiya, Kariya (JP); Shinji Usami, Okazaki (JP)

(73) Assignee: Denso Corporation, Kariya (JP)

( * ) Notice: Subject to any disclaimer, the term of this patent is extended or adjusted under 35 U.S.C. 154(b) by 337 days.

(21) Appl. No.: 11/879,511

(22) Filed: Jul. 18, 2007

(65) Prior Publication Data
US 2008/0048454 A1     Feb. 28, 2008

(30) Foreign Application Priority Data
Jul. 18, 2006     (JP) ............................. 2006-195586

(51) Int. Cl.
*H01H 1/00* (2006.01)
*H02N 11/00* (2006.01)

(52) U.S. Cl. .................... 290/38 R; 335/196
(58) Field of Classification Search ............ 290/30 R, 290/36 R, 38 R; 310/71; 335/196
See application file for complete search history.

(56) References Cited

U.S. PATENT DOCUMENTS

| | | | |
|---|---|---|---|
| 5,656,981 A * | 8/1997 | Niimi et al. .................. 335/126 |
| 5,679,935 A * | 10/1997 | Baba et al. ................. 200/17 R |
| 5,780,934 A | 7/1998 | Imanishi et al. |
| 6,404,310 B1 | 6/2002 | Ando et al. |
| 7,038,564 B1 * | 5/2006 | Kusumoto et al. .......... 335/126 |
| 2008/0024253 A1 * | 1/2008 | Kurasawa et al. .......... 335/196 |
| 2008/0084129 A1 * | 4/2008 | Utsunomiya et al. ........ 310/71 |
| 2009/0027147 A1 * | 1/2009 | Andoh ........................ 335/196 |

FOREIGN PATENT DOCUMENTS

| JP | KR 2000-0055505 A | 9/2000 |
|---|---|---|
| JP | B2 3478211 | 10/2003 |
| JP | KR 2005-0036727 A | 4/2005 |

OTHER PUBLICATIONS

Office Action issued for Korean Application No. 10-2007-0070207, Jan. 30, 2009.
Chinese Office Action and Translation, Date of Notification May 8, 2009.
Decision of Final Rejection Issued Aug. 26, 2009 from the Korean Intellectual Property Office against Application No. 10-2007-0070207 (with English translation).

* cited by examiner

*Primary Examiner*—Nicholas Ponomarenko
(74) *Attorney, Agent, or Firm*—Oliff & Berridge, PLC

(57) ABSTRACT

A starter includes a magnetic switch, a motor, and a terminal. The terminal fixed to both the magnetic switch and the motor and has two end portions in the longitudinal direction of the terminal. An end portion of the terminal confronts a movable contact within the magnetic switch. The other end portion of the terminal is connected to an electric circuitry of the motor therewithin.

16 Claims, 6 Drawing Sheets

STARTER HAVING CONNECTING MEMBER ELECTRICALLY CONNECTING MAGNETIC SWITCH AND MOTOR

CROSS-REFERENCE TO RELATED APPLICATION

This application is based on and claims the benefit of priorities from earlier Japanese Patent Application No. 2006-195586 filed Jul. 18, 2006, the description of which is incorporated herein by reference.

BACKGROUND OF THE INVENTION

1. Technical Field of the Invention

The present invention relates to a starter to start an engine, and in particular, to a connecting member provided in the starter and electrically formed to connect a magnet switch to a motor provided in the starter.

2. Related Art

A conventional starter for starting an engine is disclosed by, for example, U.S. Pat. No. 6,404,310 B1. The starter disclosed by this publication includes a magnet switch and a motor for starting the engine. This magnetic switch includes a movable contact and a pair of fixed contacts. The pair of fixed contacts provided on two external terminals, which are provided on a switch cover, so as to confront the movable contact. One of the terminals is connected to a battery via a battery cable. The other of the terminals is connected to the motor via a lead. The cable and lead are connected to screw portions of the terminals by means of nuts and washers.

The conventional starter requires various connecting parts, such as terminals, a lead, washers and nuts so as to connect one of the fixed contacts to the motor. This situation causes an increase in the number of steps for assembling the starter. Since the starter has the above mentioned structure, manufacturing costs of the starter including parts costs and assembling costs are prevented from being reduced. Additionally, the starter having above mentioned structure is difficult to reduce the size and weight. Further, it is difficult to improve reliability and durability of the electric circuitry of the starter.

SUMMARY OF THE INVENTION

The present invention has been made in light of the problems of the conventional art as mentioned above. The present invention provides a starter capable of being smaller in size, less in weight, and further improved in reliability and durability.

Specifically, the present invention provides a starter comprising a magnet switch, a motor and a connecting member. The magnet switch has a movable contact and a fixed contact connecting to a power source. The motor for starting the engine is supplied an electric power from the power source. The connecting member has a first end portion and a second end portion. The first end portion confronts the movable contact within the magnet switch and the second end portion is connected the motor therewithin. The connecting member supplies the electric power from the fixed contact to the motor via the movable contact when the movable contact contacts with the connecting member.

DETAILED DESCRIPTION OF THE PREFERRED EMBODIMENT

With reference to FIGS. 1 to 8, a starter according to an embodiment of the present invention will be described below in the order of its configuration, operations, modification and advantages.

(1. Configuration)

First, the configuration of the starter according to an embodiment will be described below.

Figure 1:
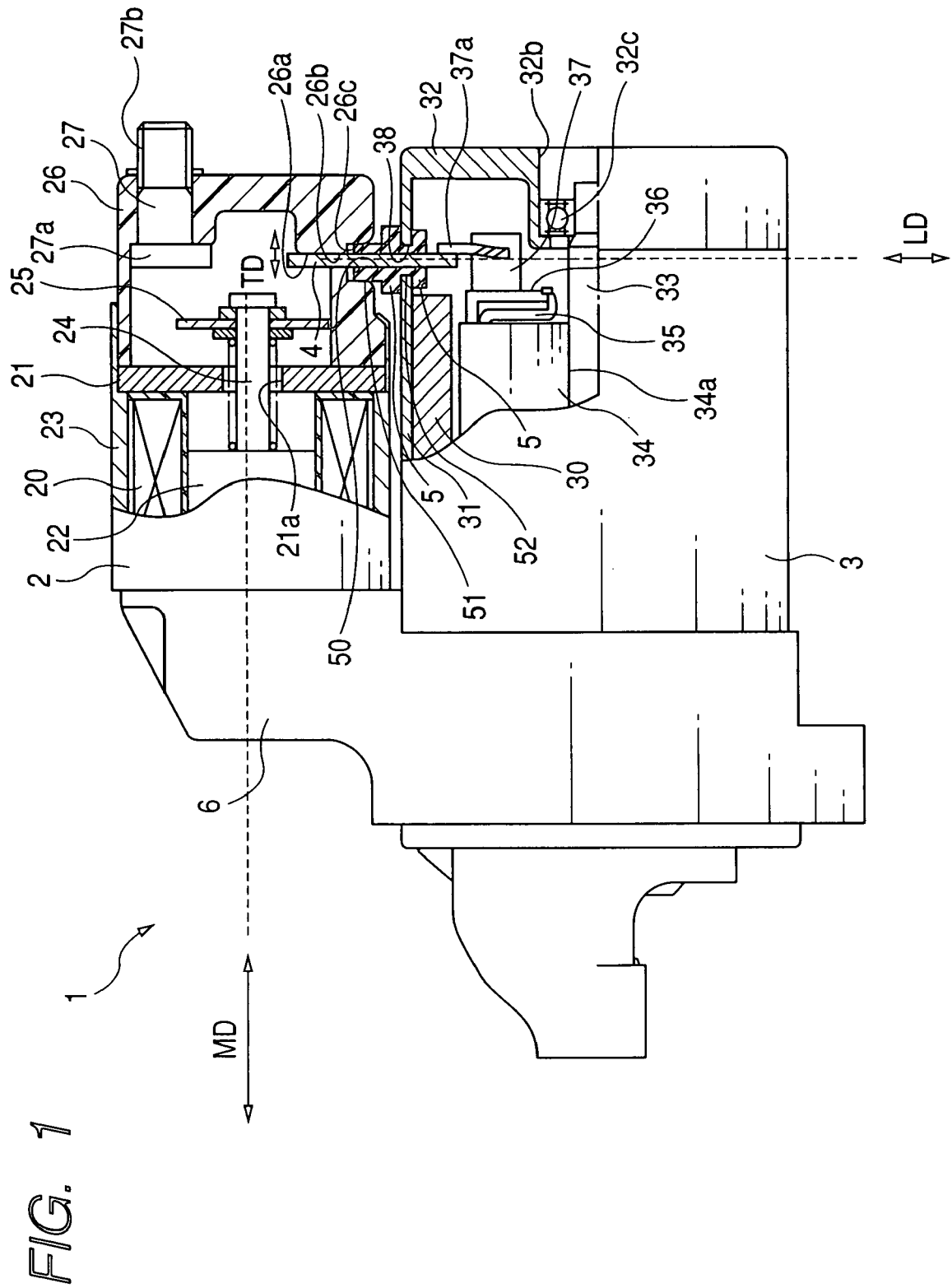
FIG. 1 is a partial cross sectional view of a starter according to an embodiment of the present invention.

As shown in FIG. 1, a starter 1 includes a magnet switch 2, a motor 3, a terminal 4 (also referred to as a plate or a connecting member) and a bush 5 (also referred to as a supporting member). The switch 2 is a device which supplies an electric current from a battery (not shown) to the motor 3 and generates a driving force to move a shift lever (not shown).

The switch 2 is composed of an excitation coil 20, a stationary core 21, a plunger 22, a switching frame 23, a rod 24, a movable contact 25 and a contact cover 26 (also referred as an enclosing member). The excitation coil 20 generates a magnetic force in response to being receiving the electric current, thereby attracting the plunger 22.

The stationary core 21 is made up of a magnetic member having a circular shape and constitutes a part of a magnetic circuit provided in the motor. The stationary core 21 has a through hole 21a which is provided at a center portion of the stationary core 21 and penetrates in an axial direction (indicated by "MD" in FIG. 1) of the switch 2. The stationary core 21 is provided on an end portion of the excitation coil 20.

The plunger 22 is made up of a magnetic member having a columnar shape, constitutes a part of the magnetic circuit and, in response to the magnetic force, moves in the axial direction ("MD" in FIG. 1) to move the movable contact 25 and the shift lever. The plunger 22 is provided on an inner side of the excitation coil 20 in a manner that the plunger can move in the axial direction. An end portion of the plunger 22 confronts the stationary core 21. The plunger 22 is pushed in the axial direction to be apart from the stationary core 21 by a return spring placed along the rod 24.

The switching frame 23 is made up of a magnetic member having a columnar shape with a bottom. The bottom of the switching frame 23 has a through hole (not shown) penetrating in the axial direction therethrough. The bottom of the switching frame 23 permits the plunger 22 to pass through this through hole. The switching frame 23 is provided to enclose the excitation coil 20 with an inner circumferential surface of the switching frame 23 contacted to an outer circumferential surface of the stationary core 21.

The rod 24 is a member having a column shape and secures the movable contact 25 to the plunger 22. The rod 24 is provided on an end portion of the plunger 22 with an end portion thereof penetrating through the through hole 21a toward the axial direction so as to apart from the plunger 22.

The movable contact 25 is made up of a metal-made member having a plate-like shape and integrally moves in the axial direction ("MD" in FIG. 1) together with the plunger 22 via the rod 24 so as to electrically connect or disconnect the terminal 4 to or from a single fixed contact 27. The movable contact 25 is provided on a tip portion of the rod 24.

Figure 2:
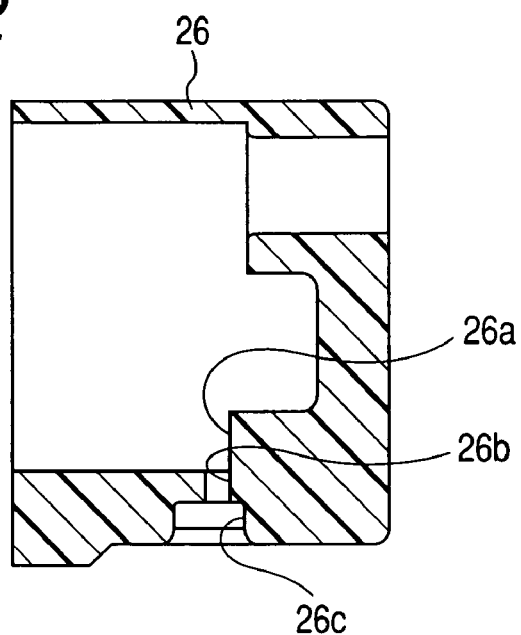
FIG. 2 is a cross sectional view of a contact-cover shown in FIG. 1.

As shown in FIGS. 1 and 2, the contact cover 26 encloses the movable contact 25 and is made of an electrically insulating material, specifically resin-made material, having a columnar shape with a bottom. On an inner side of the contact cover 26, a contact surface 26a is provided which contacts the terminal 4 and confronts the movable contact 25 in the axial direction of the plunger 22. On a column portion of the contact cover 26, a through hole 26b is provided which penetrates through the terminal 4 toward a direction perpendicular to the axial direction of the plunger 22 and comes along the contacting surface 26a. On an outer surface of the through hole 26b, a recess 26c is provided which has almost a circular shape, is biased toward the movable contact 25 from an axe of the through hole 26b, and is press fitted to an end portion of the bush 5 thereto. The contact cover 26 is caulked to an end portion of the stationary core 21 and encloses the movable contact 25.

As shown in FIG. 1, the fixed contact 27 is made up of a metal-made member having a bolt-like shape and is connected each other to the terminal 4 via the movable contact 25, thereby supplying an electric current to the motor 3. The fixed contact 27 is fixed to a bottom of the contact cover 26 so that a head portion 27a of the fixed contact 27 confronts the movable contact 25 toward the axial direction. A single screw portion 27b, protruded toward an external-side of the contact cover 26, is connected to a wiring harness (not shown).

The magnetic switch 2, which is constituted in a way described above, is fixed to an end portion of a housing 6 of the motor. The motor 3 (e.g., a DC motor), for starting the engine, generates a rotating force in response to the electric current supplied thereto. The motor 3 is composed of a magnet 30, a yoke 31, an end frame 32, a rotating axis 33, an armature core 34, an armature coil 35, a commutater 36 and a brush 37, as shown in FIG. 1.

The magnet 30 is an arc-shaped member generating a magnetic flux.

Figure 3:
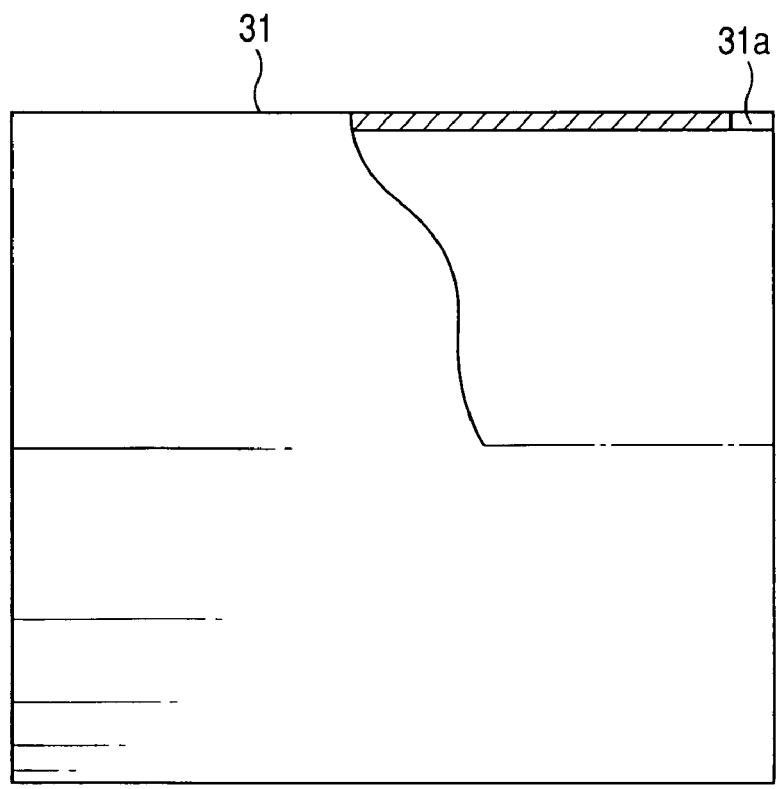
FIG. 3 is a partial cross sectional view of a yoke shown in FIG. 1.

As shown in FIGS. 1 and 3, the yoke 31 is made up of a magnetic member having a columnar shape, constitutes the magnetic circuit, and holds the magnet 30. On an end portion of the yoke 31, a notch 31a having a semi-circle shape is provided. Along an inner circumferential surface of the yoke 31, the magnets 30 are provided at equal intervals therebetween in the circumferential direction of the yoke 31.

Figure 4:
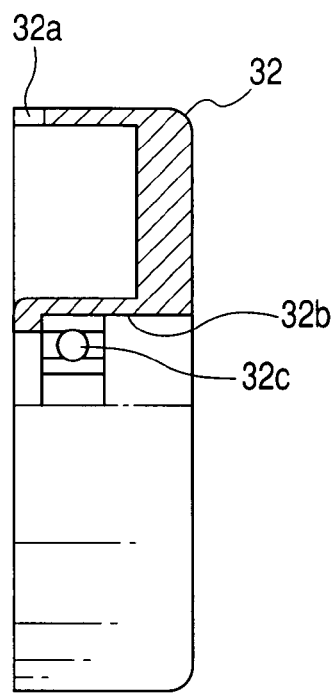
FIG. 4 is a partial cross sectional view of an end frame shown in FIG. 1.
Figure 5:
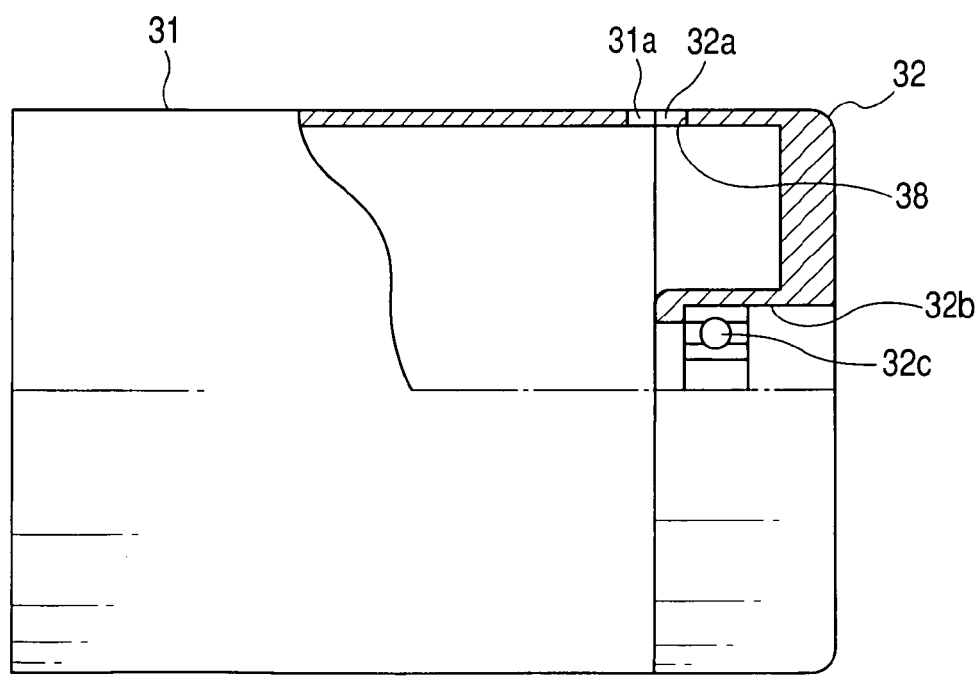
FIG. 5 is a partial cross sectional view of a yoke and an end frame shown in FIG. 1.

As shown in FIGS. 1 and 4, the end frame 32 is made up of a metal-made member, has a columnar shape with a bottom, and encloses an end portion of the yoke 31. On an end portion of the end frame 32 having a columnar shape, a notch 32a having a half round shape is provided. On a center portion of a bottom of the end frame 32, a through hole 32b is formed to be directed along the axial direction. The through hole 32b is provided with a bearing 32c. The end frame 32, of which notch 32a confronts the notch 31a of the yoke 31, encloses an end portion of the yoke 31. In this way, as shown in FIGS. 1 and 5, on an outer circumferential surface of motor 3, a through hole 38 is formed to which the other end portion of the bush 5 is tightly fitted.

As shown in FIG. 1, the rotating axis 33 is a member is made up of a metal-made member having a columnar shape and outputs the rotating force generated. The rotating axis 33 is supported in a rotatable manner via the bearing 32c provided on the end frame 32.

The armature core 34 is made up of a magnetic material having a columnar shape, constitutes a part of the magnetic circuit, and accommodates the armature coil 35. On a center portion of the armature core 34, a through hole 34a is formed along the axial direction. Around the through hole 34a, a plurality of slots (not shown), which accommodates the armature coil 35 and penetrates toward an axial direction thereof, are provided along the circumferential direction and which are positioned at equal spacing intervals therebetween in this circumferential direction. The armature core 34 is fixed to the rotating axis 33 in a manner that the rotating axis 33 penetrates the through hole 34a.

The armature coil 35 is made up of a metal-made member having a rectangular shape, is formed into a coil-like shape, and generates the rotating force when the armature coil 35 receives the current supplied thereto and crosses a magnetic flux generated by the magnet 30. The armature coil 35 is accommodated in a slot provided on the armature core 34. An end portion of the armature coil 35 is provided to be bent along an end surface of the armature core 34.

The commutater 36 is a member configured to selectively connect and disconnect an electric current fed into the armature coil 35. The commutater 36 is provided along an end surface of the armature core 34 and is formed of an end portion of the armature coil 35.

The brush 37 is made up of an electrically conductive carbon having a rectangular shape and supplies an electric current, which is fed into the brush 37 from an external thereof, to the commutater 36. The brush 37 is connected to the pigtail 37a which supplies the current to the motor 3. The brush 37 is provided in a movable manner that an end surface thereof contacts the commutater 36.

The motor 3, configured as described above, is provided so as to adjoin the magnet switch 2 and fixed to an end portion of the housing 6 so that a rotating axis of the rotating rod 33 is parallel with a longitudinal direction of the plunger 22. The through hole 26b, which is provided on the contact cover 26, and the through hole 38, which is formed when the yoke 31 and the end frame 32 are assembled together, are provided on the same axis.

The terminal 4 is made up of a metal-made member, has a rectangular shape, forms a contact of the magnetic switch 2, and electrically connects the magnetic switch 2 to the motor 3. The terminal 4 is also directly inserted into the motor 3 via a side surface of the motor 3 from the magnetic switch 2 via a side surface of the magnetic switch 2.

Figure 6:
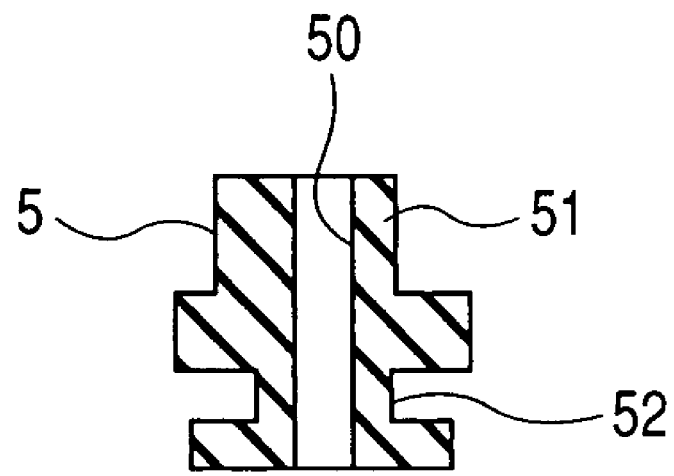
FIG. 6 is a cross sectional view of a bush shown in FIG. 1.

As shown in FIGS. 1 and 6, the bush 5 is made up of an elastic material, such as a rubber-made member, has a substantially columnar shape and fixes the terminal 4 to both the magnetic switch 2 and the motor 3. A bush 5 has a through hole 50 which has a rectangular shape and is penetrated by the terminal 4. The column-shaped portion 51 thereof is provided on an end portion of the bush 5. A centering axis of the column-shaped portion 51 is biased from that of the through hole 50. The column-shaped portion 51 is press fitted into a recess portion 26a of the contact cover 26. On an outer circumferential surface on the other end portion of the bush 5, a groove 52 of the bush 5 is press fitted to the through hole 38, which is formed between the yoke 31 and the end frame 32.

Figure 7:
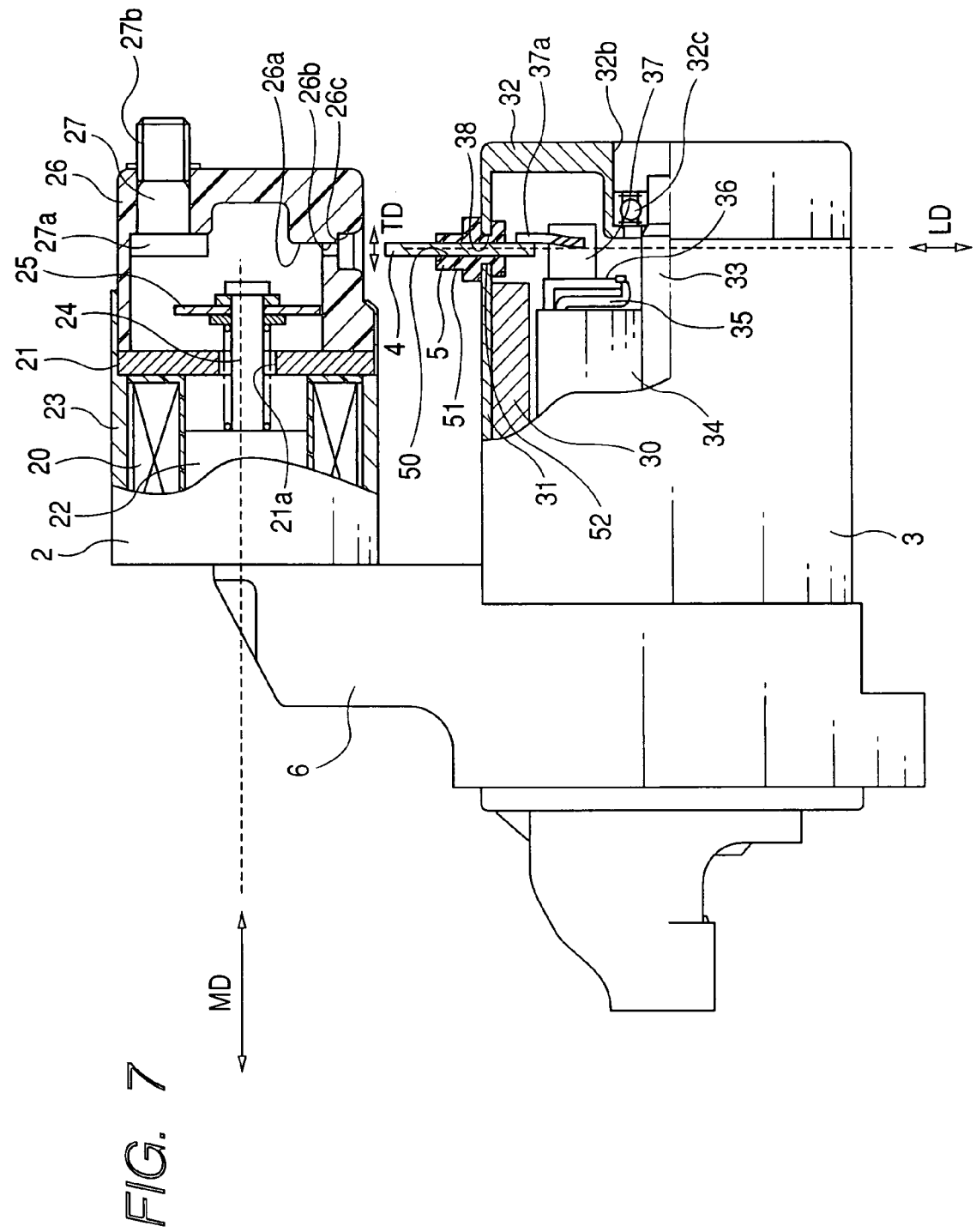
FIG. 7 is an explanatory diagram for explaining an assembling process of the starter.
Figure 8:
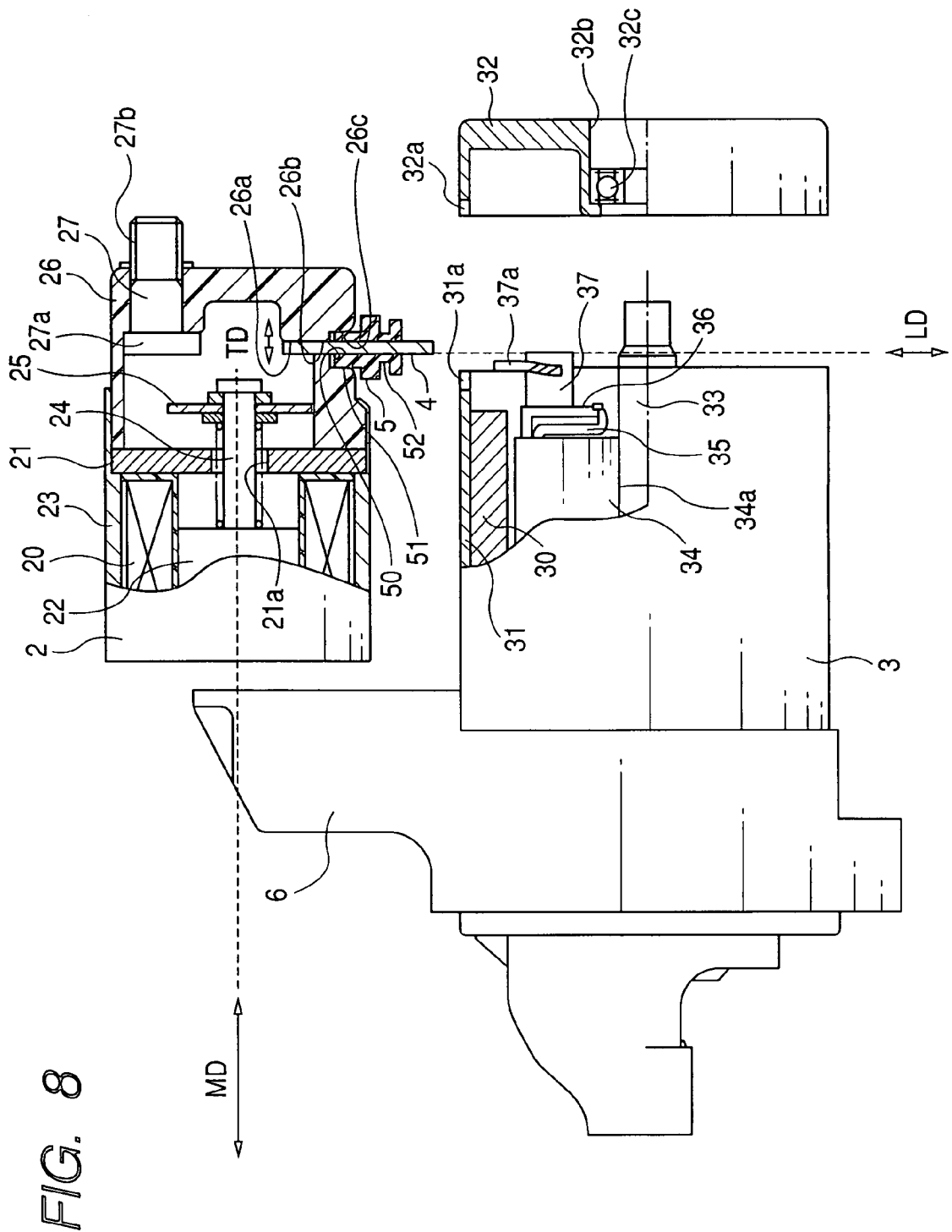
FIG. 8 is an explanatory diagram for explaining another assembling process of the starter.

As shown in FIG. 1, the terminal 4 is fixed to both the magnetic switch 2 and the motor 3 via the bush 5 and is arranged so that the longitudinal direction thereof is perpendicular to that of the plunger 22. The thickness direction thereof is parallel with the longitudinal direction of the plunger 22. The terminal 4 penetrates the through hole 50 provided on the bush 5. An end portion of the terminal 4 is opposed to the movable contact 25 in the longitudinal direction of the plunger 22 in the contact cover 26. An end surface of the movable contact 25 confronts the contacting surface 26a provided on the contact cover 26. The other end portion of the terminal 4 is brazed to the pigtail 37a of the brush 37. The columnar-shaped portion 51 of the bush 5 is press fitted to the recess 26c of the contact cover 26. The columnar-shaped portion 51 is elastically deformed by this press fitting and presses the terminal 4 to the contacting surface 26a. A side wall of the through hole 50 tightly contacts an outer surface of the terminal 4 while the columnar-shaped portion 51a tightly contacts an inner surface of the recess 26a, thereby securing a water proof characteristic around the recess 26a. On the other hand, the groove 52 of the bush 5 is elastically deformed to be press fitted to the trough hole 38 formed by the yoke 31 and the end frame 32. The groove 52 of the bush 5 tightly contacts an inner surface of the through hole 38, thereby securing a water proof characteristic around the through hole 38. As shown in FIG. 7, it is possible that the terminal 4 is fixed to the motor 3 via the bush 5 in a manner the other end portion of the terminal 4 is brazed to the pigtail 37a of the brush 37 in the motor 3, and the end portion of the terminal 4 opposes the movable contact 25 in the contact cover 26 in the longitudinal direction of the plunger 22 when the magnet switch 2 and the motor 3 are assembled together. Alternatively, as shown in FIG. 8, it is possible that the terminal 4 is fixed to the magnet switch 2 via the bush 5 in a manner the end portion of the terminal 4 opposes the movable contact 25 in the contact cover 26 in the longitudinal direction of the plunger 22, and the another portion of the terminal 4 is brazed to the pigtail 37a of the brush 37 in the motor 3 when the magnetic switch 2 and the motor 3 are assembled together.

(2. Operations)

The operations of the starter 1 will now be described with accompanying FIG. 1.

As shown in FIG. 1, when an ignition switch (not shown) is turned on, the excitation coil 20 receives an electric current supplied thereto, thereby generating a magnetic force. The magnetic force presses the plunger 22 to the stationary core 21 against a repulsing force of the return spring. Concurrently, the plunger 22 drives a shift lever, whereby a pinion (not shown) is geared to a ring gear (not shown) of the engine and makes the movable contact 25 contact both the fixed contact 27 and the end portion of the terminal via the rod 24. When the movable contact 25 contacts both the fixed contact 27 and the terminal 4, an electric current is supplied from the battery to the brush 37. The current is supplied to the armature coil 35 via the commutater 36, then the armature coil 35 crosses the magnetic flux generated by the magnet 30, thereby generating a rotating force. The rotating force is transmitted to the pinion via the rotating axis 33, thus starting the engine. When the engine starts and the ignition switch is turned off, the current supplied to the excitation coil 20 is stopped. Consequently, the magnetic force generated by the excitation coil 20 is annihilated so that the plunger 22 is pressed back by the return spring. Simultaneously, the shift lever is also pressed back. Then the pinion is geared off from the ring gear of the engine and the contact 25 is disconnected from both the fixed contact 27 and the terminal 4. Then the motor 3 is stopped. Thus starting up the engine is finished.

(3. Modification)

In this embodiment, the rotating axis direction of the rotating rod 33 is arranged to be parallel to the longitudinal direction of the plunger 22. However, other arrangements can be alternatively adopted. For example, the rotating axial direction of the rotating rod 33 can be arranged to have a crossing angle between plus/minus 30 degrees relative to the longitudinal direction of the plunger 22. Preferably, the angle is set from minus 15 degrees to plus 15 degrees.

(4. Advantages)

Advantages of the present invention will be described below.

(4.1. Reduction in Weight and Manufacturing Costs)

The magnet switch 2 and the motor 3 are directly connected to the terminal 4, whereby conventionally used members, including the external terminal, the lead, the washer and the nut, can be omitted. In other words, the wiring structure (namely connecting structure) of the present invention provides functions by using the terminal 4 alone, these functions conventionally being provided by using the external terminal, the lead, the washer and the nut. Therefore, the starter 1 can be light in weight and less in manufacturing costs, such as parts costs and assembling costs, can be reduced.

(4.2. Simplification in an Assembling Process)

In a case where the terminal 4 is fixed to the motor 3 with the state that the other end portion thereof is wired when stating to assemble the magnet switch 2 and the motor 3, the following advantages can be provided.

The terminal 4 (i.e., the connecting member, or a plate) is already fixed to the motor 3 with the state in which the other end portion thereof is wired when conducting this assembling process. In this situation, the end terminal of the terminal 4 is simultaneously and automatically configured to be opposed to the movable contact in the longitudinal direction of the plunger in the magnet switch 2, when conducting this assembling process.

In a case where the terminal 4 is fixed to the magnetic switch 2 with the state that the end portion of the terminal 4 is provided in the magnetic switch 2 when stating to assemble the magnet switch 2 and the motor 3, the following advantages can be provided.

The terminal 4 is already fixed to the magnetic switch 2 with the state in which the end portion of the terminal 4 is provided in the magnetic switch 2, the another end terminal of the terminal 4 is simultaneously and automatically configured to be wired in the motor 3, when conducting this assembling process. In this way, the structure of the starter 1 enables the automatic wiring between the other end portion of the terminal 4 and the motor 3 when assembling the magnetic switch 2 and the motor 3. Resultantly, a conventional and complicated process, that is, process for wiring the lead to the motor, can be omitted, whereby a total assembling process of the starter can be simplified.

(4.3. Improving in Durability and Reliability)

According to the foregoing embodiment, an impactive force imposed on the terminal 4 (i.e., the connecting member, or the plate) and vibrations of the terminal 4 can be suppressed, whereby the terminal 4 can be prevented from being deformed or broken. That is, the terminal 4 is imposed on the impactive force when the magnetic switch 2 and the motor 3 are assembled together. The terminal 4 is also exposed to vibrations of the engine when the engine gets started or is in operation. However, the terminal 4 is fixed to both the magnetic switch 2 and the motor 3 via the bush 5, which is made of an elastic material and functions as a cushion. Resultantly, the impactive force and the vibrations, transmitted to the terminal 4, can be suppressed, whereby the terminal 4 can be prevented from being deformed or broken. Further, the impactive force is imposed on the terminal 4 when the movable contact 25 contacts the end portion of the terminal 4. However, the terminal 4 is pressed to the contacting surface 26a of the contact cover 26 via the bush 5 made of the elastic material, whereby the bush 5 functions as the cushion and then absorbs the impactive force. Therefore, the terminal 4 can be prevented from being displaced relative to its home position even when the movable contact 25 impactively contacts the terminal 4, whereby the movable contact 25 can stably contacts the terminal 4.

(4.4. Reduction in Size)

The terminal 4 has a plate-like shape, preferably a rectangular shape and is arranged so that a longitudinal direction (LD) of the terminal 4 is perpendicular to the longitudinal direction (MD) of the plunger 22 and a thickness direction (TD) of the terminal 4 is parallel with the longitudinal direction (MD) of the plunger 22. Replacing conventional parts, i.e., the external terminal, the lead, the washer and the nut, to the terminal 4, can avoid a conventional protrusion of the washer and the nut from the contact cover 26. This replacement can achieve to reduce the length and volume of the starter 1 near by the terminal 4 in the longitudinal direction of the plunger 22, namely, the longitudinal direction of the starter 1.

It will be appreciated that the present invention is not limited to the configurations described above, but any and all modifications, variations or equivalents, which may occur to those who are skilled in the art, should be considered to fall within the scope of the present invention.

What is claimed is:

1. A starter for starting an engine comprising:
   a magnet switch having
   a movable contact and
   a fixed contact comprising
   a first post for connecting to
   a power source, and
   a second post comprising
   a connecting member to
   a motor, wherein
   said motor is for starting the engine by using
   an electric power supplied from the power source; and
   said connecting member having
   a first end portion confronting the movable contact within the magnet switch and
   a second end portion inserted into the motor and connected to an electric circuitry of the motor, the connecting member supplying the electric power from the fixed contact to the circuitry via the movable contact when the movable contact contacts the connecting member.

2. The starter of claim 1, wherein the first end portion of the connecting member confronts the movable contact within the magnetic switch when assembling the magnetic switch and the motor.

3. The starter of claim 1, wherein the second end portion of the connecting member is connected to the motor therewithin when assembling the magnetic switch and the motor.

4. The starter of claim 1, wherein the connecting member is fixed to the magnetic switch and the motor via an elastic member.

5. The starter of claim 4, wherein the magnetic switch is provided with an enclosing member enclosing the movable contact, and the first end portion confronts the movable contact with being cushioned by the elastic member.

6. The starter of claim 1, wherein the connecting member is an electrically conducting plate.

7. The starter of claim 6, wherein the connecting member is rectangular in outer shape.

8. The starter of claim 7, wherein the connecting member is provided so that a longitudinal direction thereof is perpendicular to a moving direction of the movable contact.

9. The starter of claim 8, wherein the connecting member is provided so that a thickness direction thereof is parallel to a moving direction of the movable contact.

10. The starter of claim 1 wherein,
    the magnet switch has a plunger rod moving along a longitudinal direction thereof,
    the motor has a rotating axis and an axial direction thereof parallel to the rotating axis; and
    an angle between the longitudinal direction and the axial direction is equal to or smaller than 30 degrees.

11. The starter of claim 10 wherein an angle between the longitudinal direction and the axial direction is equal to or smaller than 15 degrees.

12. The starter of claim 11 the longitudinal axial directions are parallel to each other.

13. A starter for starting an engine comprising:
    a motor for starting the engine;
    a magnetic switch having
    a movable contact and
    a fixed contact comprising
    a first post for connecting to
    a power source and
    a second post comprising
    a plate for connecting to the motor, wherein
    said plate is connecting
    an electric circuitry of the motor to the power source via the plate, the movable contact and the fixed contact when the movable contact contacts the plate, thereby supplying an electric power to the electric circuitry from the power source.

14. The starter of claim 13 wherein the plate is provided in an interior of the starter.

15. The starter of claim 13 wherein the plate is directly inserted into the motor from the magnetic switch.

16. The starter of claim 15 wherein the plate is directly inserted into the motor via a side surface of the motor from the magnetic switch via a side surface of the magnetic switch.

* * * * *